United States Patent [19]
Worschech et al.

[11] Patent Number: 5,010,123
[45] Date of Patent: Apr. 23, 1991

[54] STABILIZER FOR CHLORINE-CONTAINING OLEFIN POLYMERS, A PROCESS FOR ITS PRODUCTION AND POLYMERS CONTAINING THE STABILIZER

[75] Inventors: Kurt Worschech, Loxstedt; Peter Wedl, Bremerhaven; Erwin Fleischer, Schiffdorf; Frido Loeffelholz, Bremerhaven-Surheide; Manfred Jaeckel, Loxstedt, all of Fed. Rep. of Germany

[73] Assignee: Neynaber Chemie GmbH, Loxstedt, Fed. Rep. of Germany

[21] Appl. No.: 333,655

[22] Filed: Apr. 4, 1989

[30] Foreign Application Priority Data

Apr. 6, 1988 [DE] Fed. Rep. of Germany ....... 3811493

[51] Int. Cl.$^5$ .................... C08K 5/524; C08K 5/10
[52] U.S. Cl. ................ 524/114; 252/400.61; 524/120; 524/128; 524/151; 524/306; 524/310; 524/317; 524/357; 524/399; 524/450; 524/489

[58] Field of Search ............ 524/120, 128, 151, 450, 524/306, 310, 317, 489, 399, 357, 114; 252/400.61

[56] References Cited

U.S. PATENT DOCUMENTS

| | | | |
|---|---|---|---|
| 4,116,907 | 9/1978 | Shiohara et al. | 524/83 |
| 4,220,570 | 9/1980 | Loffelholz et al. | 524/399 |
| 4,220,570 | 9/1980 | Löffelholz et al. | 524/310 |
| 4,221,687 | 9/1980 | Minagawa et al. | 524/399 |
| 4,338,226 | 7/1982 | Worschech et al. | 524/302 |
| 4,686,255 | 8/1987 | Erwied et al. | 524/356 |
| 4,751,261 | 6/1988 | Miyata et al. | 524/357 |

Primary Examiner—Veronica P. Hoke
Attorney, Agent, or Firm—Ernest G. Szoke; Wayne C. Jaeschke; Daniel S. Ortiz

[57] ABSTRACT

Stabilizers for chlorine-containing olefin polymers containing Ca complexes of 1,3-diketones, hydrocarbon waxes and esters and/or partial esters of saturated, straight-chain $C_{12}$–$C_{34}$ monocarboxylic acids, in conjunction with zinc salts of saturated, straight-chain $C_8$–$C_{22}$ monocarboxylic acids and esters of phosphorous acid, provide the polymers with excellent properties in regard to processability and temperature stability.

30 Claims, No Drawings

STABILIZER FOR CHLORINE-CONTAINING OLEFIN POLYMERS, A PROCESS FOR ITS PRODUCTION AND POLYMERS CONTAINING THE STABILIZER

BACKGROUND OF THE INVENTION

1. Field of the Invention

The invention is a stabilizer for polymers of chlorine-containing olefins, a process for preparation of the stabilizer and polymers containing the stabilizer.

The stabilizer of the invention is useful for stabilizing PVC and PVC copolymers, particularly suspension, bulk and emulsion PVC.

2. Statement of Related Art

There is a trend to replace the heavy metal stabilizers used in rigid PVC products, such as lead and cadmium compounds, by stabilizers based on calcium and zinc. This change has been successful in certain fields. For example, PVC bottles for drinking water have been produced without heavy metal stabilizers for reasons of odor.

The production of calendered films based on Ca/Zn stabilizers does not present any problems, provided the films are opaque. However, the production of transparent or glass-clear films without heavy metal stabilizers is difficult. Relatively large quantities of epoxides, particularly epoxidized soybean oil, are required to stabilize the films. However, since these co-stabilizers have a plasticizing effect, they cannot be used in the manufacture of PVC pressure pipes. Nevertheless, even pressure pipes can be produced without difficulty using Ca/Zn stabilizers, cf. DE-OS 29 41 596. In cases such as these, however, the problem of adequate stabilization is solved by coloring the pipes dark grey or dark brown so that a good early color is not a key factor.

By contrast, rigid PVC is required to have an extremely good early color in the shaped article industry. Shaped article manufacture differs from pipe manufacture in that the shaped article cross-sections can be extremely complex and are often made with extremely thin walls. In addition, shaped articles generally require a good finish which frequently necessitates the addition of various modifiers which increase the viscosity of the PVC melt and complicate material flow. In this case, the known Ca/Zn stabilizers and added epoxides are not sufficient for effective stabilization, nor are additions of co-stabilizers, such as polyols or sodium aluminium silicates. Although polyols, such as pentaerythritol, improve the early color, they tend to sublime and cause plating in the calibrating units of the production lines, adversely affecting the surface quality of the shaped articles. Even the combined use of short-chain pentaerythritol esters (pentaerythritol mono-, di- and triacetates) and free polyols, has not produced a solution to this problem.

Although stabilization of chlorine-containing olefin polymers with commercial 1,3-diketones, for example benzoyl stearoyl methane, produces a light early color, this light early color is not retained in the course of processing for prolonged periods. The same disadvantages attend the stabilizing systems disclosed in DE-PS 27 16 389 which contain acetyl acetonates of calcium and/or magnesium in addition to calcium silicates or aluminates, mercaptans or mercaptides and calcium salts of monocarboxylic acids.

The present invention is a stabilizer for polymers based on chlorine-containing olefins which provides the polymers with the following advantageous properties:
1. freedom from heavy metals,
2. stable or persistent early color,
3. no discoloration at relatively high temperatures for the period of time required for the production of shaped articles,
4. resistance to environmental factors, particularly where the shaped articles are used outdoors (UV stability),
5. problem-free processibility of the stabilized polymers attributable to the absence of deposits on mold walls.

BRIEF DESCRIPTION OF THE INVENTION

Other than in the operating examples, or where otherwise indicated, all numbers expressing quantities of ingredients or reaction conditions used herein are to be understood as modified in all instances by the term "about."

According to the invention, the chlorine-containing polyolefins are stabilized by a stabilizer containing:
(a) Ca complexes of 1,3-diketones of the formula

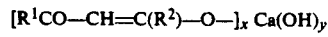

$$[R^1CO-CH=C(R^2)-O-]_x Ca(OH)_y$$

in which $R^1$ and $R^2$ can be the same or different and represent radicals selected from the group consisting of $C_1$–$C_4$ alkyl, phenyl, phenyl substituted in the p-position; x has a value of 1 to 2 and y has a value of 1 to 0 with the proviso that $x+y=2$,
(b) hydrocarbon wax and
(c) at least one of full esters of saturated, straight-chain $C_{12}$–$C_{34}$ monocarboxylic acids with polyols containing at least 2 carbon atoms and at least 2 hydroxy groups and partial esters of saturated, straight-chain $C_{12}$–$C_{34}$ monocarboxylic acids with polyols containing at least 2 carbon atoms and polyols containing at least 2 hydroxy groups which, as a number average, contain at least one free hydroxyl group and, optionally,
(d) zinc salts of saturated, straight-chain $C_8$–$C_{22}$ monocarboxylic acids.

DETAILED DESCRIPTION OF THE INVENTION

The Ca complexes of 1,3-diketones can be neutral (x=2, y=0) or basic (x=1, y=1) compounds. The groups $R^1$ and $R^2$ in the formula can be, for example, methyl, ethyl, propyl, butyl, phenyl, p-chlorophenyl groups and the like; the groups $R^1$ and $R^2$ are preferably methyl groups; the neutral compounds in which x=2 and y=0 are preferred.

The hydrocarbon waxes present in the stabilizers of the invention are those typically used in the processing of PVC, i.e. polyethylene waxes and in particular paraffin waxes having melting points in the range from 52° to 110° C. and preferably in the range from 70° to 80° C.

The esters and/or partial esters of saturated, straight-chain $C_{12}$–$C_{34}$ monocarboxylic acids present in the stabilizers according to the invention are disclosed in DE-OS 26 42 509. The preferred polyols for the esters and/or partial esters contain up to 15 carbon atoms and include glycerol, diglycerol, triglycerol, trimethylolpropane, ditrimethylolpropane, pentaerythritol, dipentaerythritol and the like. Preferred monocarboxylic acids are stearic acid and/or palmitic acid, although lauric, myristic, behenic and montanic acids may also be used. Typical full esters are ethylene glycol distearate, glycerol tristearate and pentaerythritol tetrastearate. Typical representatives of partial esters are pentaerythritol distearate and glycerol sesquimontanate.

The zinc salts useful in the stabilizer of the invention are known. Zinc octoate and technical zinc palmitate/stearate mixtures are preferred. Basic zinc salts of the $(ZnO)_n Zn(RCOO)_2$ type, for example with $n=0.5-2$, may also be used.

In preferred embodiments of the invention, the stabilizer contains the following components:
(a) Ca acetyl acetonate obtained from 1 mol $Ca(OH)_2$ and 1 to 2 mol acetyl acetone,
(b) paraffin or polyethylene waxes,
(c) diesters of pentaerythritol, glycerol and/or trimethylolpropane with saturated, straight-chain $C_{12}-C_{22}$ monocarboxylic acids and, optionally,
(d) zinc distearate.

The stabilizerer can contain the 1,3-diketones, calculated from the quantity of Ca/diketone complexes present, and the paraffin or polyethylene waxes in ratios by weight of from 5:2 to 1:1. In addition, the 1,3-diketones, calculated from the quantity of Ca/diketone complexes present, and the zinc salts of saturated, straight-chain $C_8-C_{22}$ monocarboxylic acids can be present in ratios by weight to one another of 2:1 to 3:5, depending on the particular application.

In another embodiment of the invention, the stabilizer may additionally contain
(e) secondary or tertiary esters of phosphorous acid $(P(OH)_3)$ with $C_8-C_{22}$ monoalkanols, phenol and/or $C_6-C_{12}$ alkyl-substituted phenol and, optionally, polyols containing at least 2 carbon atoms and at least 2 hydroxyl groups.

Typical phosphites are listed below wherein "alkyl" means an alkyl group containing 8 to 22 carbon atoms and "aryl" means a phenyl or $C_6-C_{12}$ alkyl-substituted phenyl group and "alkyl" and "aryl" are interchangeable with one another. The phosphites are preferably tertiary esters, i.e. all the OH functions at the phosphorus atom are esterified and include: trialkyl phosphite, dialkyl aryl phosphite, alkyl diaryl phosphite, triaryl phosphite.

The corresponding secondary phosphites (containing a free OH function at the phosphorus atom) may also be used.

The "mixed" esters of phosphorous acid with polyols are also useful. They are formed by reaction of dialkyl or diaryl phosphites with the free OH groups of a polyol or by reaction of a monoalkyl or a monoaryl phosphite with two 2 OH groups of a polyol to form a heterocyclic ring; in the latter case, 2 or more than 2 monoalkyl or monoaryl phosphites may also be reacted given a suitable number of OH groups in the polyol. Typical esters include ethylene glycol bis-(dialkyl phosphite), glycerol tris-(dialkyl phosphite), pentaerythritol bis-(alkyl phosphite), ethylene glycol alkyl phosphite, ethylene glycol bis-(diaryl phosphite), propylene glycol bis-(diaryl phosphite), trimethylolpropane tris-(dialkyl phosphite).

Some of the phosphites are commercially available or may be readily prepared, for example, from phosphorus trichloride and the corresponding alcohols. In general, the reaction proceeds without difficulty to the dialkyl or diaryl phosphite stage. The reaction of the third OH function at the phosphorus atom generally requires reaction of the corresponding chlorinated compound.

The use of the phosphites leads to a further improvement in the early color of the polymers stabilized with the stabilizers according to the invention.

In another preferred embodiment of the invention, the stabilizer may additionally contain the following additives:
(f) synthetic, crystalline, finely divided sodium aluminosilicates which contain 13 to 25% by weight bound water and, in their anhydrous form, have the composition $0.7-1.1\ Na_2O \cdot Al_2O_3 \cdot 1.3-2.4\ SiO_2$,
(g) epoxides of esters of unsaturated, straight-chain fatty acids, and/or
(h) standard additives which influence rheology or processibility of the polymers.

The use of sodium aluminosilicates in PVC polymers is disclosed in DE-OS 29 41 596. Epoxides of esters of unsaturated, straight-chain fatty acids, in particular, epoxidized soybean oils which have oxirane values of from 6 to 8 and iodine values of less than 5 are known for use in PVC polymers.

Standard additives influencing the rheology or processibility of the polymers are, in particular, the usual flow improvers, oxidized polyethylene waxes, wax esters, hydroxystearic acids (as antiplating agents) and the like.

In another preferred embodiment of the invention, the stabilizer has the following composition:
(a) 1 to 4 and more preferably 2 to 2.8 parts by weight of a Ca complex of a 1,3-diketone.
(b) 0.4 to 4.0 and more preferably 1.2 to 2.0 parts by weight of hydrocarbon waxes,
(c) 1.2 to 6.0 and more preferably 2.0 to 4.0 parts by weight of the full esters and/or partial esters of saturated, straight-chain $C_{12}-C_{34}$ monocarboxylic acids,
(d) 0.8 to 4.0 and more preferably 1.6 to 2.4 parts by weight of the zinc salts of saturated, straight-chain $C_{18}-C_{22}$ monocarboxylic acids and, optionally,
(e) 0.4 to 4 and more preferably 1.2 to 3.2 parts by weight of the secondary or tertiary esters of phosphorous acid,
(f) 1.2 to 12 and more preferably 2.0 to 6.0 parts by weight of sodium aluminosilicates,
(g) 2.0 to 12 and more preferably 4.0 to 6.0 parts by weight of the epoxidized fatty acid esters and/or
(h) typical quantities of additives which influence the rheology or processibility of the polymers.

In another preferred embodiment of the invention, the stabilizers contain 10 to 40 parts weight and more preferably 20 to 30 parts by weight of the Ca/diketone complexes, based on the toal weight of the stabilizer.

The stabilizers of the invention can be prepared by mixing the individual components. In certain cases, however, problems can arise in regard to the dispersibility of the Ca/diketone complex in the stabilizer. If crystalline, compact particles remain in the stabilizer composition, stability is not affected. However, the solid particles may present problems in extrusion of PVC molding compounds, leading for example to crater formation on the article surfaces. Accordingly, it is advantageous to prepare the Ca/diketone complexes "in situ" in a melt of hydrocarbon wax and full esters and/or partial esters, the zinc salts optionally being added at least partly before the reaction or being prepared in situ in the melt from zinc oxide and $C_8-C_{22}$ monocarboxylic acids before the in situ preparation of the Ca complexes.

The present invention is also a process for the production of the stabilizers containing the components a to c and, optionally, components d, e, f, f and/or h in effective quantities or in the quantities indicated. Components e to h are best added after the reaction. However, providing they show inert behavior in the context of the production process, they may be added before or during the reaction.

The present invention also relates to stabilized polymers comprising chlorine-containing olefins, particularly rigid PVC, which are stabilized with the stabilizers according to the invention in such a quantity that they contain components a to c and, optionally, d, e, f, g and/or h in effective quantities.

Particularly preferred stabilized polymers contain, per 100 parts by weight polymer, (a) 0.25 to 1.0 and more preferably 0.5 to 0.7 part by weight of Ca complexes of 1,3-diketones, (b) 0.1 to 1.0 and more preferably 0.3 to 0.5 part by weight of hydrocarbon waxes, (c) 0.3 to 1 5 and more preferably 0.5 to 1.0 part by weight of at least one of full esters and partial esters of saturated, straight-chain $C_{12}$–$C_{34}$ monocarboxylic acids, (d) 0.2 to 1.0 and more preferably 0.4 to 0.6 part by weight of zinc salts of saturated, straight-chain $C_8$–$C_{22}$ monocarboxylic acids and, optionally, (e) 0.1 to 1 and more preferably 0.3 to 0.8 part by weight of at least one of secondary and tertiary esters of phosphorous acid, (f) 0.3 to 3 and more preferably 0.5 to 1.5 parts by weight of sodium aluminosilicates, (g) 0.5 to 3 and more preferably 1 to 1.5 parts by weight of epoxidized fatty esters and (h) typical quantities of the additives which influence rheology or processibility.

The invention is illustrated by the following Examples.

EXAMPLE 1

Preparation of a calcium acetylacetonate/zinc stearate/hydrocarbon wax/partial ester stabilizer 44.8 g (0.17 mol) technical stearic acid (approx. 50% by weight stearic acid and 50% by weight palmitic acid), 30 g paraffin (Mp. 71° C.) and 100 g pentaerythritol distearate were heated with melting to 130° C. 6,9 g (0.085 mol) zinc oxide were introduced into the melt with stirring and the melt was stirred under reduced pressure (15 to 20 hPa) at 130° to 150° C. until the zinc oxide had dissolved. After cooling to 110° C., 40 g (0.4 mol) acetyl acetone and 15.5 g (0.2 mol) calcium hydroxide successively added to the reaction mixture. The melt was then heated with stirring at 100° to 110° C. under slightly reduced pressure (700 to 900 hPa) until the calcium oxide had dissolved. Towards the end of the reaction, the pressure was reduced to 15-20 hpa. The reaction mixtuer solidified on cooling to ambient temperature.

EXAMPLE 2

Stabilization of a PVC polymer

A mixture of 100 parts by weight suspension PVC, K-value 65, 1 part by weight of a liquid epoxidized soybean oil (oxirane value 6 to 8, iodine value less than 5) and 1 part by weight of a synthetic zeolite having the composition $Na_2O:Al_2O_3:SiO_2$ of 0.9:1:2.04, water content 21.6% by weight; maximum particle size 3 to 6μ, was initially prepared and 2.3 parts weight of the stabilizer of Example 1 added thereto.

The PVC molding compound obtained was processed for 5 minutes to form test sheets on 450×220 mm co-rotating laboratory mixing rolls (Berstorff); roll temperature 170° C., roll speed 12.5 r.p.m. To test static thermal stability, the approximately 0.5 mm thick sheet was cut into square test specimens (edge length 10 mm) which were subsequently exposed to a temperature of 180° C. in a drying cabinet with six rotating shelves (Heraeus FT 420 R). Samples were taken at intervals of 15 minutes and inspected for discoloration. The results are shown in the Table.

The time after which the samples showed distinct discoloration is shown in the Table for each molding compound under "early color stability". The time after which the tests had to be terminated through excessive discoloration is shown under "stability failure". For the rest, all the samples were very slightly yellowish in color before the beginning of the heat treatment.

EXAMPLE 3

A PVC/stabilizer mixture was prepared in the same way as in Example 2, but with addition of 0.5 part by weight didecyl phenyl phosphite (commercial product) to 100 parts by weight PVC.

The PVC molding compound was tested as described in Example 2, the results are shown in the Table.

EXAMPLE 4

A PVC/stabilizer mixture was prepared in the same way as in Example 2, but with addition of 0.5 part by weight tris-(nonylphenyl)-phosphite (commercial product) to 100 parts PVC. The molding compound obtained was tested as described in Example 2, the results are shown in the Table.

EXAMPLE 5

A PVC/stabilizer mixture was prepared in the same way as in Example 2, but with addition of 0.5 part by weight pentaerythritol bis-(stearyl phosphite) (commercial product).

The molding compound obtained was tested as described in Example 2, the results are shown in the Table.

The results show that, even for the molding compound of Example 2, the early color stability at 30 minutes is good. In addition, the stability failure after 105 minutes shows that the molding compound is heat-stable for all standard processing techniques. Examples 3 to 5 show the considerable increase in early color stability which can be obtained by adding esters of phosphorous acid.

TABLE

| Example no. (molding compound) | Early color stability (mins.) | Stability failure (mins.) |
|---|---|---|
| 2 | 30 | 105 |
| 3 | 60 | 105 |
| 4 | 45 | 105 |
| 5 | 45 | 105 |

We claim:

1. A stabilizer for chlorine-containing olefin polymers which comprises: a stabilizing effective amount of;
(a) at least one Ca complex of a 1,3-diketone of the formula:

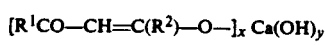

wherein $R^1$ and $R^2$ may be the same or different and represent radicals selected from the group consisting of $C_1$–$C_4$, alkyl, phenyl and phenyl substituted in the p-position, x has a value of 1 to 2 and y has a value of 1 to 0 with the proviso that $x+y=2$, (b) at least one hydrocarbon wax; and (c) at least one ester selected from the group consisting of full esters of saturated, straight-chain $C_{12}$–$C_{34}$ monocarboxylic acids of polyols containing at least 2 carbon atoms and at least 2 hydroxy groups and partial esters of saturated, straight-chain $C_{12}$–$C_{34}$ monocarboxylic acids of polyols containing at least 2 carbon atoms and at least 2 hydroxy groups which, as a number average, contain at least one free hydroxyl group.

2. A stabilizer of claim 1 containing at least one zinc salt of a saturated, straight-chain $C_8$–$C_{22}$ monocarboxylic acid.

3. A stabilizer of claim 1 containing
(a) Ca acetyl acetonate wherein y is 1 to 0 and x is 1 to 2;
(b) at least one of paraffin and polyethylene wax,
(c) at least one diester of pentaerythritol, glycerol or trimethylolpropane with saturated, straight-chain $C_{12}$–$C_{22}$ monocarboxylic acids.

4. A stabilizer of claim 3 containing zinc distearate.

5. A stabilizer of claim 1 additionally containing
(a) at least one secondary or tertiary ester of phosphorous acid (P(OH)$_3$) with at least one compound selected from the group consisting of $C_8$–$C_{22}$ monoalkanols, phenol, a $C_6$–$C_{12}$-alkyl-substituted phenol and polyols containing at least 2 carbon atoms and at least 2 hydroxyl groups.

6. A stabilizer of claim 2 additionally containing
(a) at least one secondary or tertiary ester of phosphorous acid (P(OH)$_3$) with at least one compound selected from the group consisting of $C_8$–$C_{22}$ monoalkanols, phenol, a $C_6$–$C_{12}$-alkyl-substituted phenol and polyols containing at least 2 carbon atoms and at least 2 hydroxyl groups.

7. A stabilizer of claim 1 containing stabilizing effective amounts of:
(a) at least one synthetic, crystalline, finely divided sodium aluminosilicate which contains 13 to 25% by weight bound water and, in their anhydrous form, have the composition 0.7–1.1 Na$_2$O·Al$_2$O$_3$·1-.3–2.4 SiO$_2$,
(b) at least one epoxide of an ester of an unsaturated, straight-chain fatty acid and
(c) standard additives which influence the rheology or processibility of the polymers.

8. A stabilizer of claim 2 containing stabilizing effective amounts of:
(a) at least one synthetic, crystalline, finely divided sodium aluminosilicate which contains 13 to 25% by weight bound water and, in their anhydrous form, have the composition 0.7–1.1 Na$_2$O·Al$_2$O$_3$·1-.3–2.4 Sio$_2$,
(b) at least one epoxide of an ester of an unsaturated, straight-chain fatty acid and
(c) standard additives which influence the rheology or processibility of the polymers.

9. A stabilizer of claim 1 comprising:
(a) 1 to 4 parts by weight of at least one Ca complex of a 1,3-diketone;
(b) 0.4 to 4.0 parts by weight of at least one hydrocarbon wax;
(c) 1.2 to 6.0 parts by weight of at least one composition selected from the group consisting of full esters of saturated, straight-chain $C_{12}$–$C_{34}$ monocarboxylic acids, and partial esters of saturated straight-chain $C_{12}$–$C_{34}$ monocarboxylic acids; and
(d) 0.8 to 4.0 parts by weight of at least one zinc salt of saturated, straight-chain $C_{18}$–$C_{22}$ monocarboxylic acids.

10. A composition of claim 9 containing 0.4 to 4 parts by weight of a secondary or tertiary ester of phosphorous acid.

11. A composition of claim 9 containing 1.2 to 12 parts by weight of sodium aluminosilicate.

12. A composition of claim 9 containing 2.0 to 12 parts by weight of an epoxidized fatty acid ester.

13. A composition of claim 9 containing an effective amount of at least one of a rheology controlling agent and a processibility controlling agent of the polymers.

14. A stabilizer of claim 9 containing 10 to 40 parts by weight of at least one Ca complex of a 1,3-diketone to 100 parts by weight of the total weight of the stabilizer.

15. A stabilizer of claim 1 prepared by reaction of calcium hydroxide and the 1,3-diketone in a melt of hydrocarbon waxes and partial esters.

16. A stabilizer of claim 15 wherein at least one zinc salt of $C_8$–$C_{22}$ monocarboxylic acid is introduced into the melt before the reaction of hee calcium hydroxide and the 1,3-diketone.

17. A stabilizer of claim 15 wherein the zinc salt of $C_8$–$C_{22}$ monocarboxylic acid is prepared by reacting zinc oxide and the monocarboxylic acid in the melt before reaction of calcium hydroxide and the 1,3-diketone.

18. A process for the production a stabilizer for chlorine-containing olefin polymerd, which comprises:
(a) at one Ca complex of a 1,3-diketone of the formula:

$$[R_1CO\text{---}CH\!=\!C(R^2)\text{---}O\text{---}]_x Ca(OH)_y$$

wherein $R^1$ and $R^2$ may be the same or different and represent radicals selected from the group consisting of $C_1$–$C_4$ alkyl, phenyl and phenyl substituted in the p-position, x has a value of 1 to 2 and y has a value of 1 to 0 with the proviso that $x+y=2$, (b) at least one hydrocarbon wax and (c) at least one ester selected from the group consisting of full esters of saturated, straight-chain $C_{12}$–$C_{34}$ monocarboxylic acids of polyols containing at least 2 carbon atoms and at least 2 hydroxy groups and partial esters of saturated, straight-chain $C_{12}$–$C_{34}$ monocarboxylic acids of polyols containing at least 2 carbon atoms and at least 2 hydroxy groups which, as a number average, contain at least one free hydroxyl group, wherein the at least one complex of Ca and the 1,3-diketone is formed by a reaction of calcium hydroxide and the 1,3-diketone in a melt of hydrocarbon waxes and full esters and/or partial esters.

19. A process of claim 18 wherein a zinc salt of a $C_8$–$C_{22}$ monocarboxylic acid is provided in the melt before the formation of the Ca complex with the 1,3-diketone.

20. A process of claim 18 wherein the zinc salt is provided by reaction of zinc oxide and at least on e $C_8$–$C_{22}$ monocarboxylic acid in the melt.

21. A process of claim 18, wherein
(a) at least one secondary or tertiary ester of phosphorous acid with at least one composition selected from the group consisting of $C_8$–$C_{22}$ monoalkanols, phenol, $C_6$–$C_{12}$-alkyl-substituted phenol and polyols containing at least 2 carbon atoms and at least 2 hydroxyl groups, (b) synthetic, crystalline, finely divided sodium alumosilicates which contain 13 to 25% by weight bound water and, in their anhydrous form, have the composition $0.7-1.1\ Na_2O \cdot Al_2O_3 \cdot 1.3-2.4\ SiO_2$, (c) epoxides of esters of unsaturated, straight-chain fatty acids and (d) rheology controlling or processibility controlling polymer additives are added before or after the reaction.

22. A process of claim 18 for the production of a stabilizer having the following composition (a) 1 to 4 parts by weight of the Ca complex of 1,3-diketones;

(b) 0.4 to 4.0 parts by weight of the hydrocarbon wax;

(c) 1.2 to 6.0 parts by weight of at least one ester selected from the group consisting of full esters and partial esters of saturated, straight-chain $C_{12}-C_{34}$ monocarboxylic acids; and (d) 0.8 to 4.0 parts by weight of a zinc salt of saturated, straight-chain $C_{18}-C_{22}$ monocarboxylic acid.

23. A process of claim 22 wherein 0.4 to 4 parts by weight of the secondary or tertiary esters of phosphorous acid are added.

24. A process of claim 23 wherein 1.2 to 12 parts by weight of sodium aluminosilicate is added.

25. A process of claim 24 wherein 2.0 to 12 parts by weight of an epoxidized fatty acid ester is added.

26. A process of claim 25 wherein effective amounts of polymer rheology controlling and processibility controlling compositions are added.

27. A stabilized chlorine-containing lefin polymer, containing a stabilizing quantity of:

(a) At least one Ca complex of a 1,3-diketone of the formula:

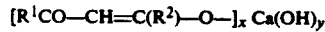

wherein $R^1$ and $R^2$ may be the same or different and represent radicals selected from the group consisting of $C_1-C_4$, alkyl, phenyl, and phenyl substituted in the p-position, x has a value of 1 to 2 and y has a value of 1 to 0 with the proviso that $x+y=2$, (b) at least one hydrocarbon wax and (c) at least one composition selected from the group consisting of full esters of saturated, straight-chain $C_{12}-C_{34}$ monocarboxylic acids and polyols containing at least 2 carbon atoms and at least 2 hydroxy groups and partial esters of saturated, straight-chain $C_{12}-C_{34}$ monocarboxylic acids and polyols containing at least 2 carbon atoms and at least 2 hydroxy groups which, as a number average, contain at least one free hydroxyl goup.

28. A stabilized polymer of claim 27 further comprising at least one zinc salt of a saturated, straight-chain $C_8-C_{22}$ monocarboxylic acids.

29. A stabilized polymer of claim 27 further comprising at least one additive selected from the group consisting of:

(a) secondary and tertiary esters of phosphorous acid with $C_8-C_{22}$ monoalkanols, phenol, $C_6-C_{12}$-alkyl-substituted phenol and polyols containing at least 2 carbon atoms and at least 2 hydroxyl groups, (b) synthetic, crystalline, finely divided sodium aluminosilicates which contain 13 to 25% by weight bound water and, in their anhydrous form, have the composition $0.7-1.1\ Na_2O \cdot Al_2O_3 \cdot 1.3-2.4\ SiO_2$, (c) epoxides of esters of unsaturated, straight-chain fatty acids and (d) rheology controlling and processibility controlling polymer additives.

30. A stabilized polymer of claim 27 containing per 100 parts by weight polymer (a) 0.25 to 1.0 parts by weight of the Ca complex of 1,3-diketones, (b) 0.1 to 1.0 parts by weight of the hydrocarbon wax, (c) 0.3 to 1.5 parts by weight of the esters or partial esters of saturated, straight-chain $C_{12}-C_{34}$ monocarboxylic acids, (d) 0.2 to 1.0 parts by weight of at least one zinc salt of a saturated, straight-chain $C_8-C_{22}$ monocarboxylic acid (e) 0.1 to 1 parts by weight of at least one secondary or tertiary ester of phosphorous acid, (f) 0.3 to 3 parts by weight of sodium aluminosilicate, (g) 0.5 to 3 parts by weight of an epoxidized fatty ester and (h) rheology or processibility controlling additives.

* * * * *